United States Patent
Harada et al.

(10) Patent No.: US 8,245,248 B2
(45) Date of Patent: Aug. 14, 2012

(54) OPTICAL DISK APPARATUS HAVING GUIDE SHAFT ADJUSTING MECHANISM

(75) Inventors: Nozomu Harada, Kawasaki (JP); Seiji Hamaie, Kawasaki (JP); Shinya Asano, Tokyo (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 706 days.

(21) Appl. No.: 12/336,666

(22) Filed: Dec. 17, 2008

(65) Prior Publication Data
US 2009/0222844 A1    Sep. 3, 2009

(30) Foreign Application Priority Data
Mar. 3, 2008 (JP) ................ 2008-052456

(51) Int. Cl.
*G11B 7/00* (2006.01)
(52) U.S. Cl. ................ 720/677; 720/675
(58) Field of Classification Search .......... 720/672, 720/674–680, 691–694, 673
See application file for complete search history.

(56) References Cited

U.S. PATENT DOCUMENTS

| 3,947,894 A | * | 3/1976 | Chimura | 360/137 |
| 7,213,251 B2 | * | 5/2007 | Park et al | 720/675 |
| 2001/0006506 A1 | | 7/2001 | Aoyama et al. | |
| 2005/0081225 A1 | * | 4/2005 | Tanimoto et al. | 720/676 |

FOREIGN PATENT DOCUMENTS

| CN | 1309391 A | 8/2001 |
| JP | 2001-101671 | 4/2001 |

OTHER PUBLICATIONS

China State Intellectual Property Office (SIPO) office action for SIPO patent application CN200810177655.0 (Nov. 16, 2010).

* cited by examiner

*Primary Examiner* — Nathan Danielsen
(74) *Attorney, Agent, or Firm* — Kilpatrick Townsend & Stockton LLP

(57) ABSTRACT

There are provided a disk motor arranged on a chassis, an optical pickup that performs recording and reproducing of a signal from an information recorded surface of an optical disk, a pair of guide shafts arranged on the optical pickup to guide the optical pickup radially of the optical disk, adjustment screw that move at least one ends of the guide shafts in a direction substantially perpendicular to a surface of the chassis, a leaf spring arranged on a frame body to bias the one end of the guide shaft toward the surface of the chassis, and the leaf spring includes a support surface that supports the one end of the guide shaft, and a stopper portion projecting from the support surface to define a clearance between the support surface and the surface of the chassis.

4 Claims, 12 Drawing Sheets

OPTICAL DISK APPARATUS HAVING GUIDE SHAFT ADJUSTING MECHANISM

INCORPORATION BY REFERENCE

This application claims the benefit of priority of Japanese Application No. 2008-05245 filed on Mar. 3, 2008, the disclosure of which also is entirely incorporated herein by reference.

TECHNICAL FIELD

The present invention relates to an optical disk apparatus that performs at least one of recording and reproducing of a signal from an information recorded surface of an optical disk as mounted.

RELATED ART

Conventionally, an optical disk apparatus is demanded of tilt adjustment at high accuracy and comprises a skew adjustment mechanism that adjusts an angle of an optical pickup so that an outgoing light irradiated onto an optical disk surface from the optical pickup and an incident light reflected by the optical disk surface to be made incident upon the optical pickup are made perpendicular to the optical disk surface. Such skew adjustment mechanism includes one, in which, for example, a guide shaft movably supporting an optical pickup is interposed by a bias member such as torsion coil spring, leaf spring, etc. and an adjustment screw (adjustment member) and inclination of the guide shaft is adjusted by an extent, over which the adjustment screw is screwed (see, for example, JP-A-2001-101671).

SUMMARY OF THE INVENTION

When a coil spring or a torsion coil spring is used as a bias member for adjustment of inclination of the guide shaft, however, the spring is lengthened in the case where the guide shaft comes off from between the spring and an adjustment screw, so that a clearance defined between the spring and the adjustment screw becomes narrow. Therefore, it becomes difficult to reinsert the guide shaft and a decrease in operability is brought about. On the other hand, since a leaf spring is difficult to set low in spring constant, it is difficult to widen a clearance defined between the leaf spring and an adjustment screw when the guide shaft is inserted into the clearance, so that a decrease in operability is brought about.

Hereupon, it is an object of the invention to provide an optical disk apparatus, in which a guide shaft can be readily inserted into a clearance defined between a bias member and an adjustment member and an improvement in operability in assembling work is achieved.

Further, it is a further object of the invention to provide an optical disk apparatus, in which a guide shaft inserted between a bias member and an adjustment member is inhibited from being made loose and an improvement in dimensional stability at the time of assembly is achieved In order to attain the object, the invention provides an optical disk apparatus that performs at least one of recording and reproducing of a signal from an information recorded surface of an optical disk mounted thereon, the optical disk apparatus comprising a chassis, a disk motor, which is arranged on the chassis and on which a turntable having a disk put surface, on which the optical disk is put, is rotatably provided, an optical pickup that performs at least one of recording and reproducing of a signal from the information recorded surface of the optical disk, a pair of guide shafts arranged on the chassis to movably support the optical pickup to guide the same radially of the optical disk, an adjustment member that moves at least one end of the guide shaft in a direction substantially perpendicular to a surface of the chassis, and a bias member arranged on an opposite side to the adjustment member with one end of the guide shaft interposed therebetween and biasing the one end of the guide shaft toward the surface of the chassis, and wherein the bias member includes a support surface, which supports the one end of the guide shaft, and a stopper portion projecting from the support surface to abut against the surface of the chassis to define a clearance between the support surface and the surface of the chassis.

Also, the invention provides an optical disk apparatus that performs at least one of recording and reproducing of a signal from an information recorded surface of an optical disk mounted thereon, the optical disk apparatus comprising a chassis, a disk motor, which is arranged on the chassis and on which a turntable having a disk put surface, on which the optical disk is put, is rotatably provided, an optical pickup that performs at least one of recording and reproducing of a signal from the information recorded surface of the optical disk, a pair of guide shafts arranged on the chassis to movably support the optical pickup to guide the same radially of the optical disk, an adjustment member that moves at least one end of the guide shaft in a direction substantially perpendicular to a surface of the chassis, a leaf spring arranged on an opposite side to the adjustment member with the one end of the guide shaft interposed therebetween and biasing the one end of the guide shaft toward the surface of the chassis, and a guide-shaft inserted member arranged in opposition to the free end of the leaf spring and having an opening, into which the one end of the guide shaft is inserted, and wherein the leaf spring is formed at a free end thereof with an inclined surface, of which one side along the free end is inclined further so as to be separate from the surface of the chassis than the other side.

BRIEF DESCRIPTION OF THE DRAWINGS

These and other features, objects and advantages of the present invention will become more apparent from the following description when taken in conjunction with the accompanying drawings wherein.

DETAILED DESCRIPTION

Subsequently, an optical disk apparatus according to an preferred embodiment of the invention will be described with reference to the drawings. In addition, the embodiment described below is exemplary of the invention and the invention is not limited only to the embodiment. Accordingly, the invention can be embodied in various configurations as far as it does not depart from the gist thereof. In the respective figures referred to in the embodiment, respective members are depicted in a state of not corresponding to actual ones in thickness, size, scaling, etc. so that an explanation therefor is made understandable.

Figure 1:
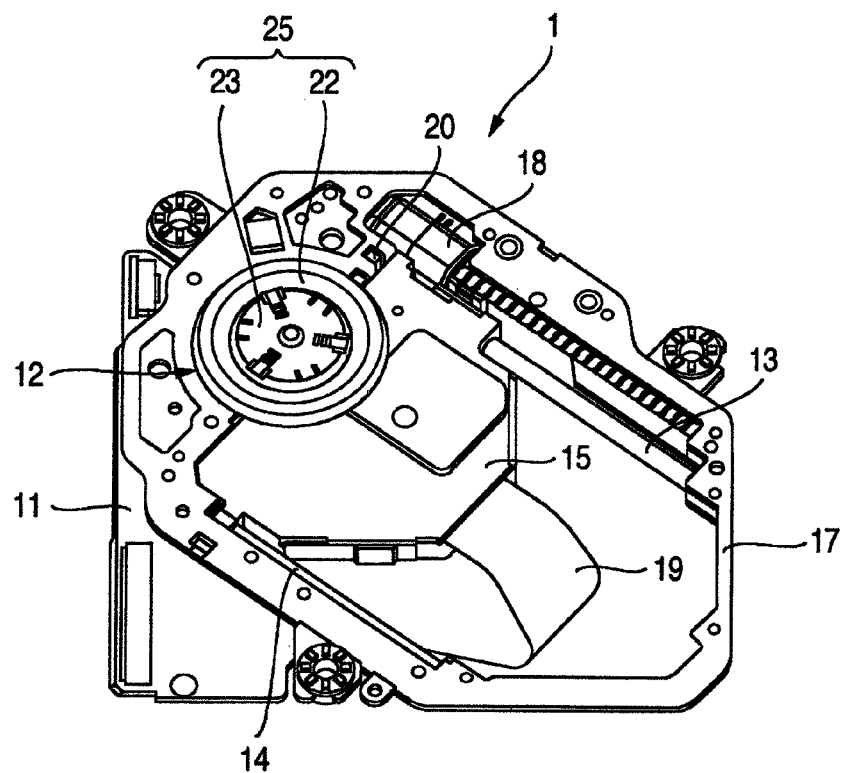
FIG. 1 is a perspective view showing an optical disk apparatus, according to an embodiment, as viewed from a side, on which an optical disk is put.
Figure 2:
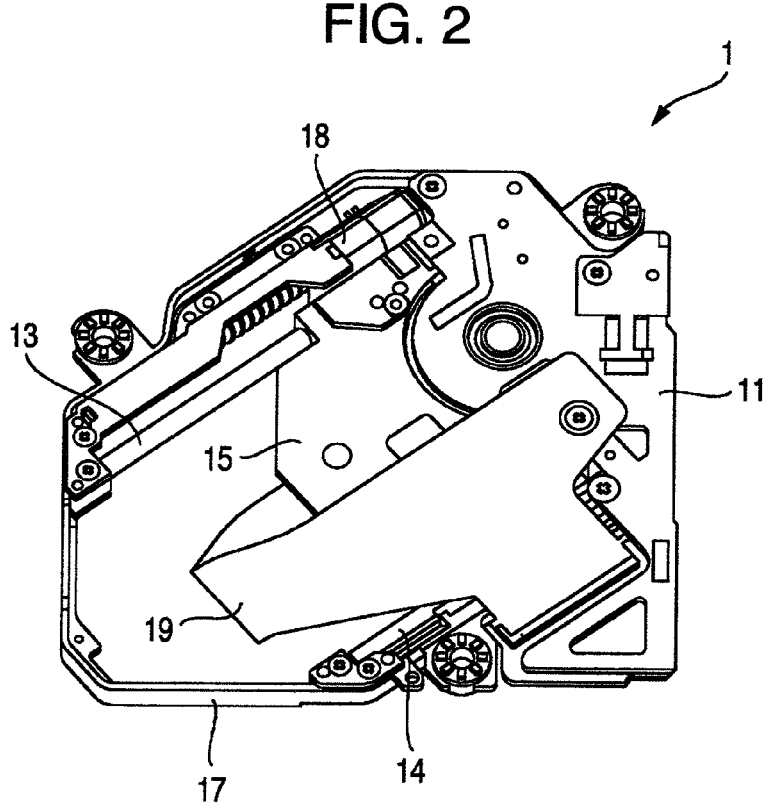
FIG. 2 is a perspective view showing the optical disk apparatus of FIG. 1 as viewed from an opposite side.
Figure 3:
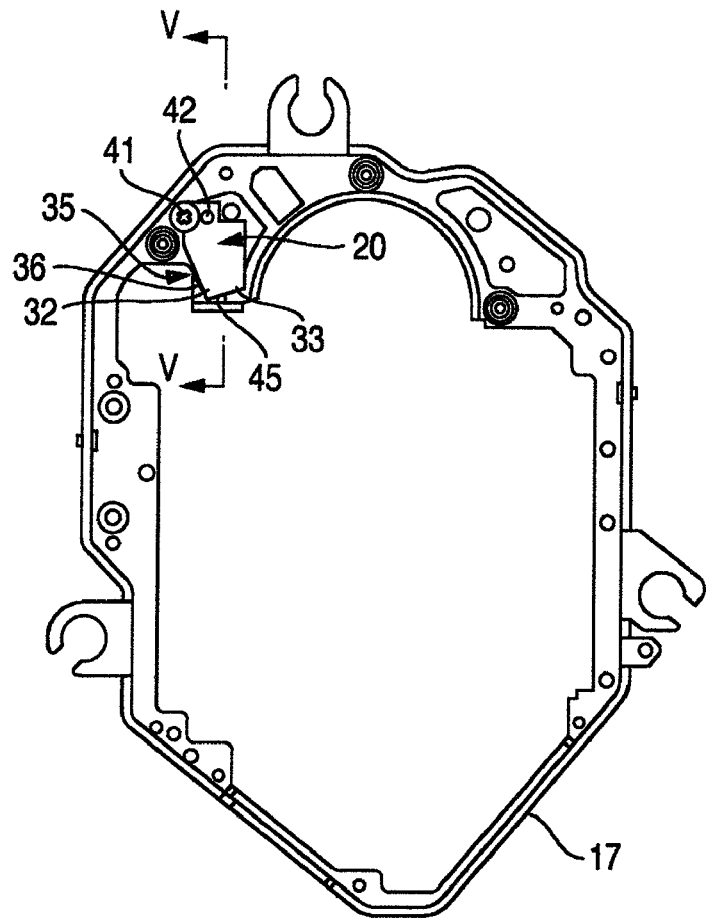
FIG. 3 is a plan view showing a frame body, on which a leaf spring being a constituent element of the optical disk apparatus shown in FIG. 1 is arranged, as viewed from an opposite side to a side, on which an optical disk is put.
Figure 4:
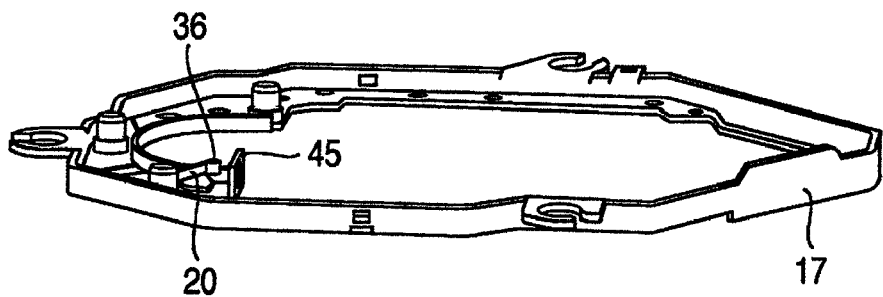
FIG. 4 is a perspective view showing a chassis shown in FIG. 3.
Figure 5:
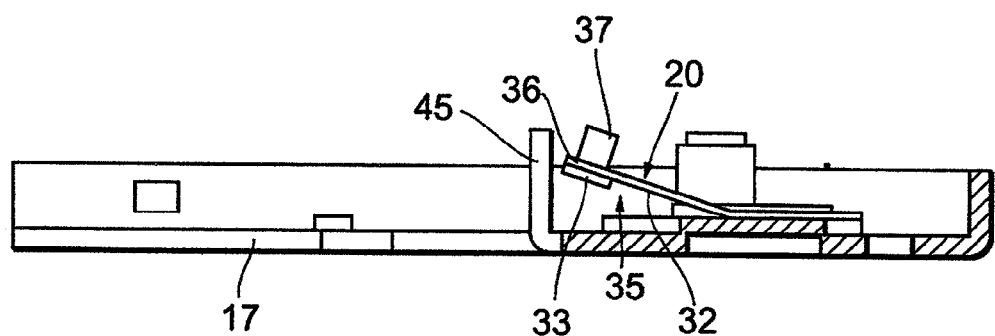
FIG. 5 is a cross sectional view taken along the line V-V in FIG. 3.
Figure 6:
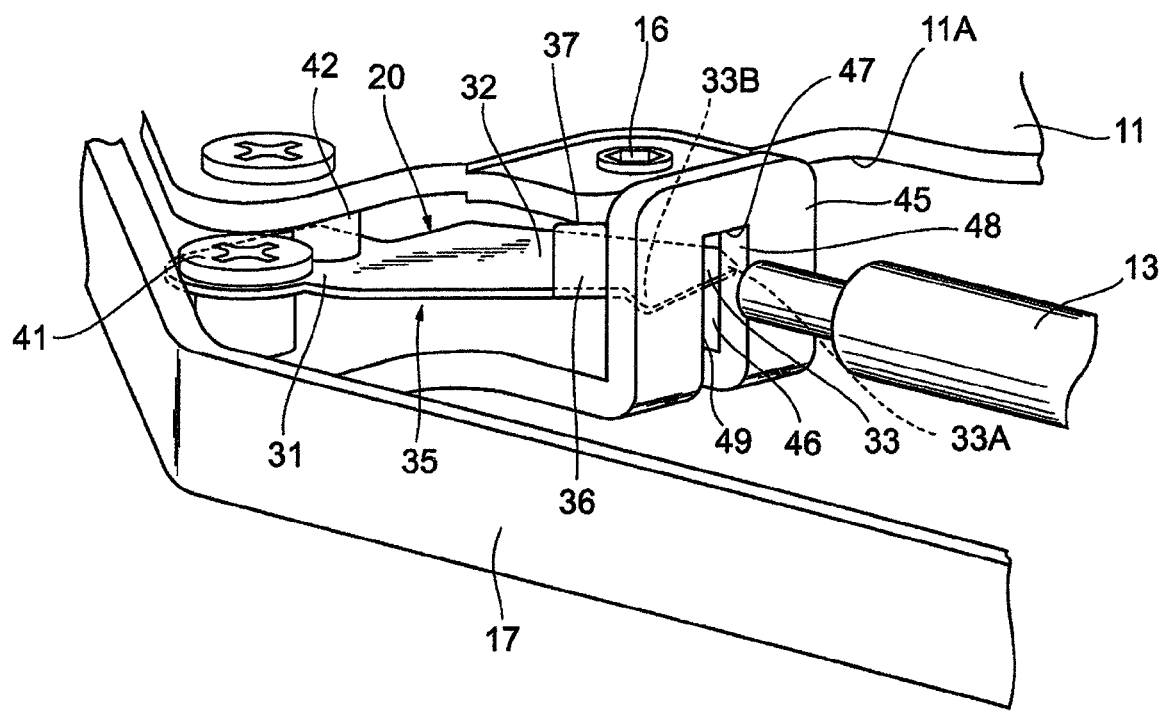
FIG. 6 is a perspective view showing the neighborhood of an end of a guide shaft being a constituent element of the optical disk apparatus shown in FIG. 1.
Figure 7:
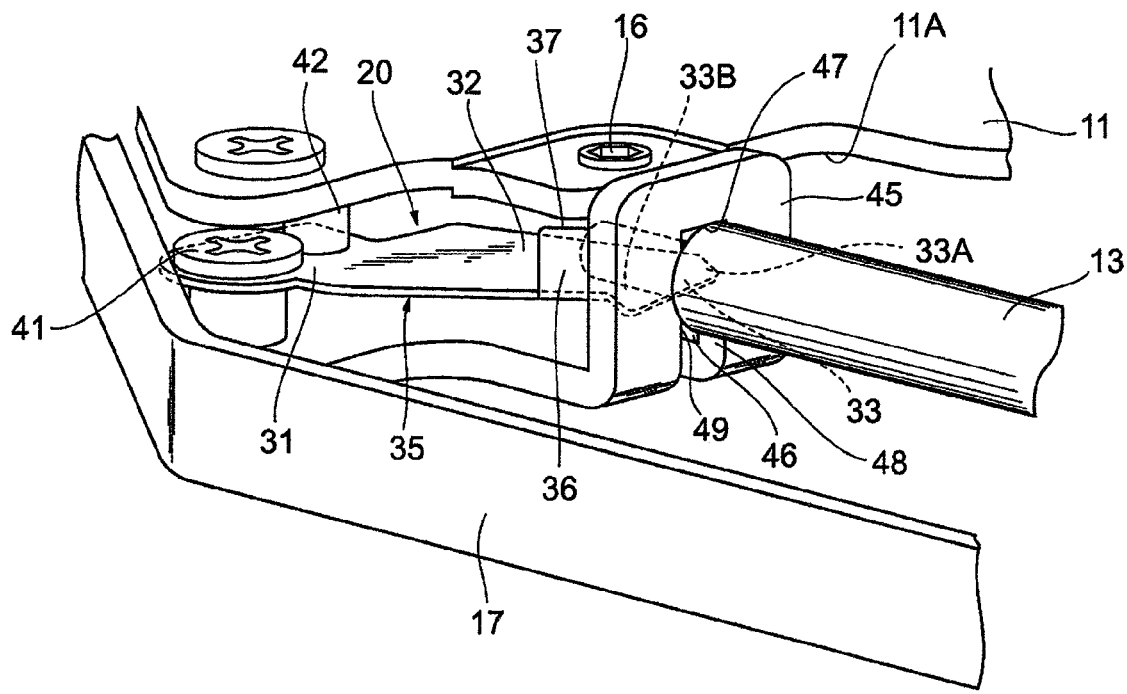
FIG. 7 is a perspective view showing the neighborhood of the end of the guide shaft being a constituent element of the optical disk apparatus shown in FIG. 1.
Figure 11:
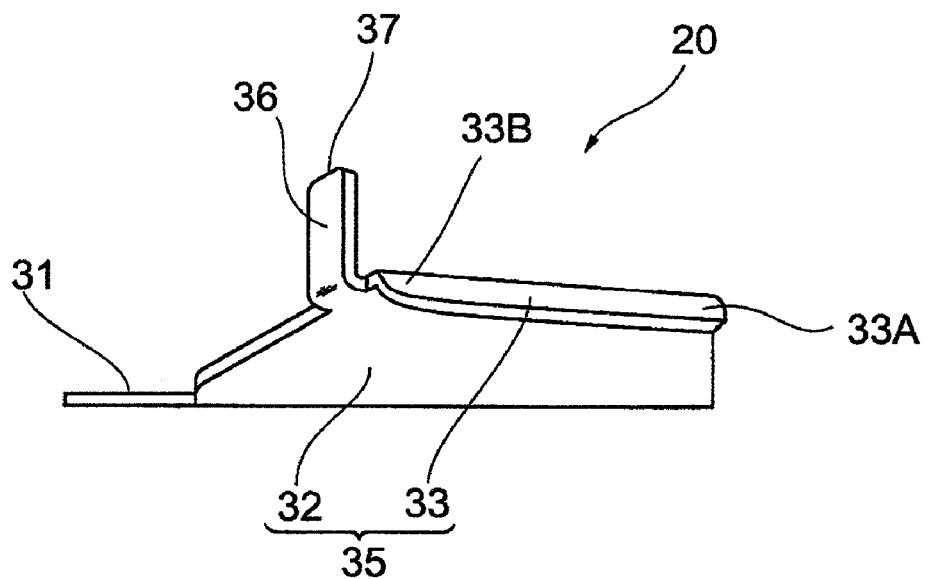
FIG. 11 is a front view showing the leaf spring shown in FIG. 3.
Figure 12:
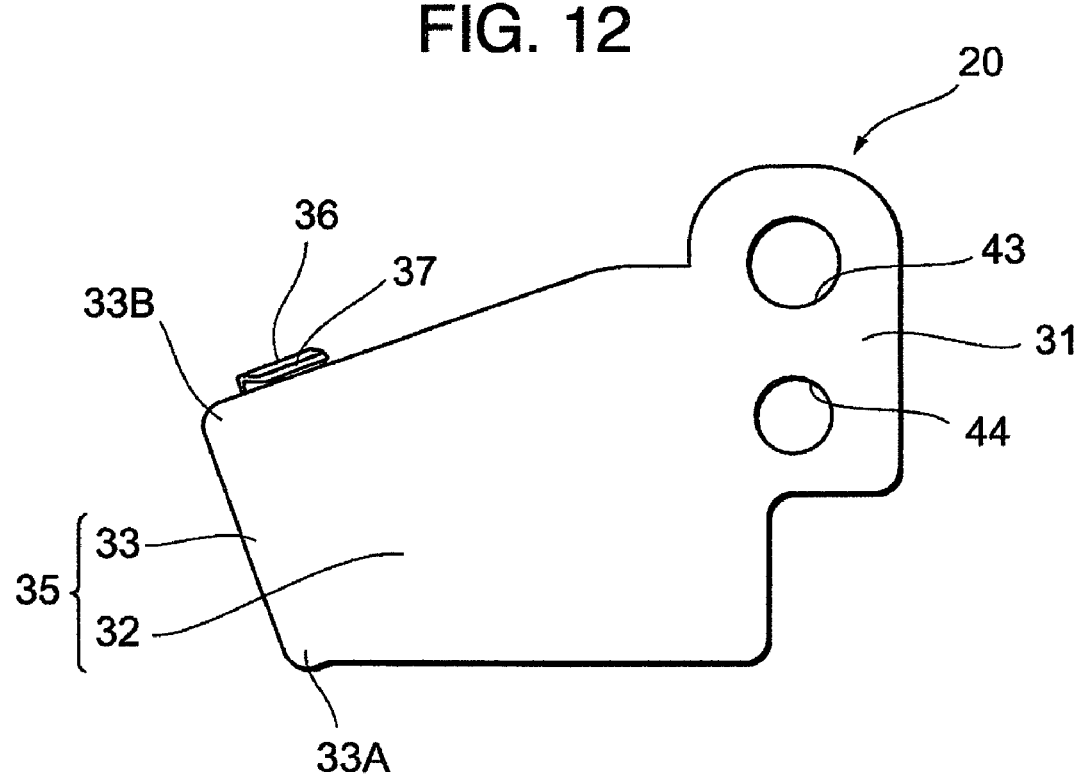
FIG. 12 is a plan view showing the leaf spring shown in FIG. 11.
Figure 13:
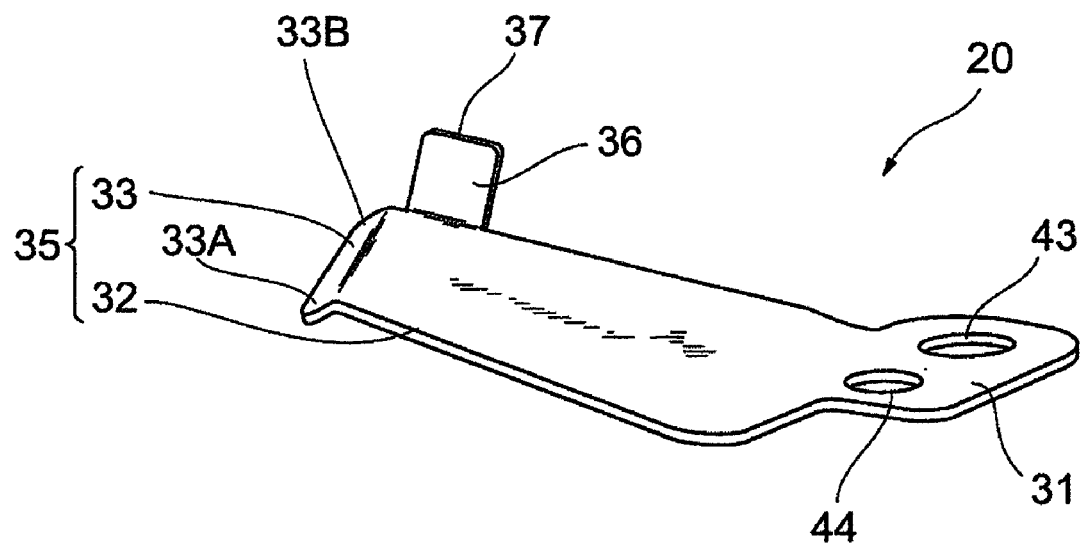
FIG. 13 is a perspective view the leaf spring shown in FIG. 11.
Figure 14:
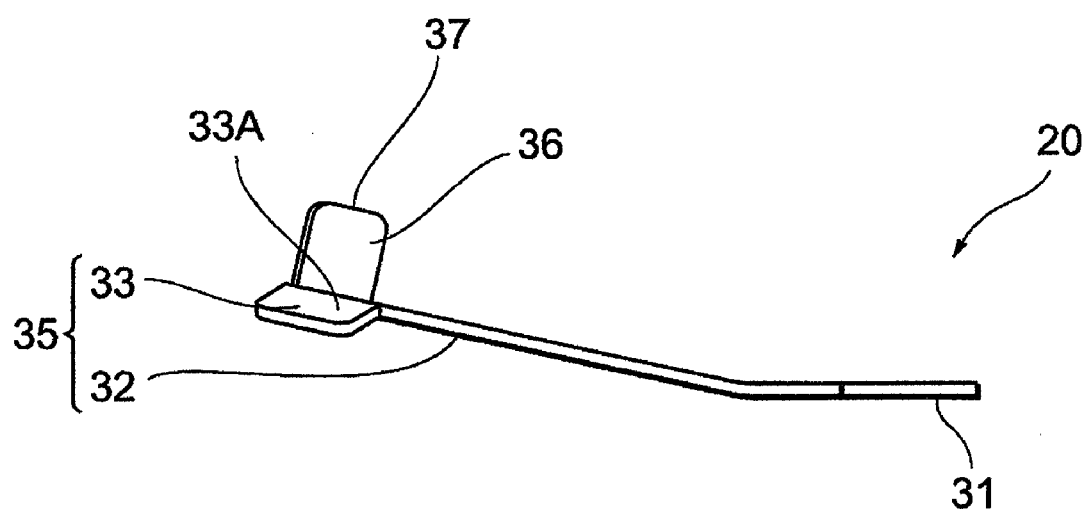
FIG. 14 is a side view the leaf spring shown in FIG. 11.
Figure 15:
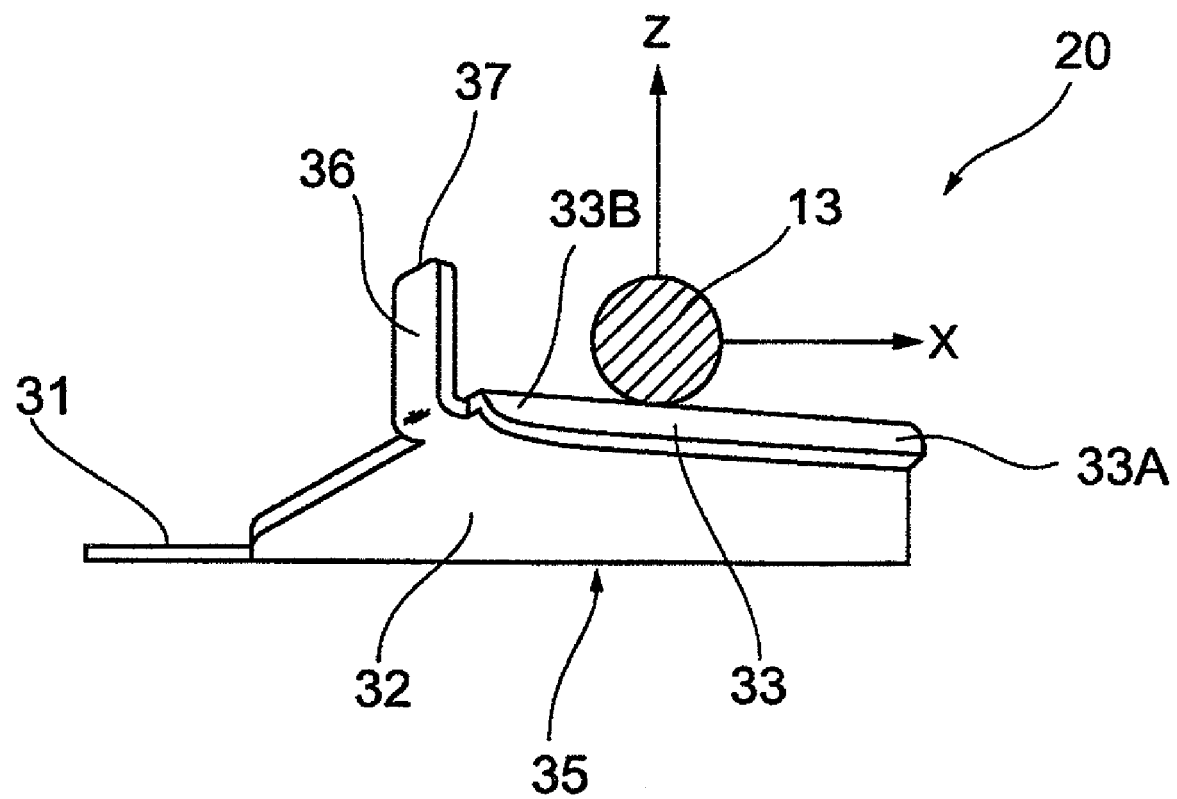
FIG. 15 is a conceptual view illustrating the relationship between the leaf spring shown in FIG. 11 and the guide shaft.
Figure 16:
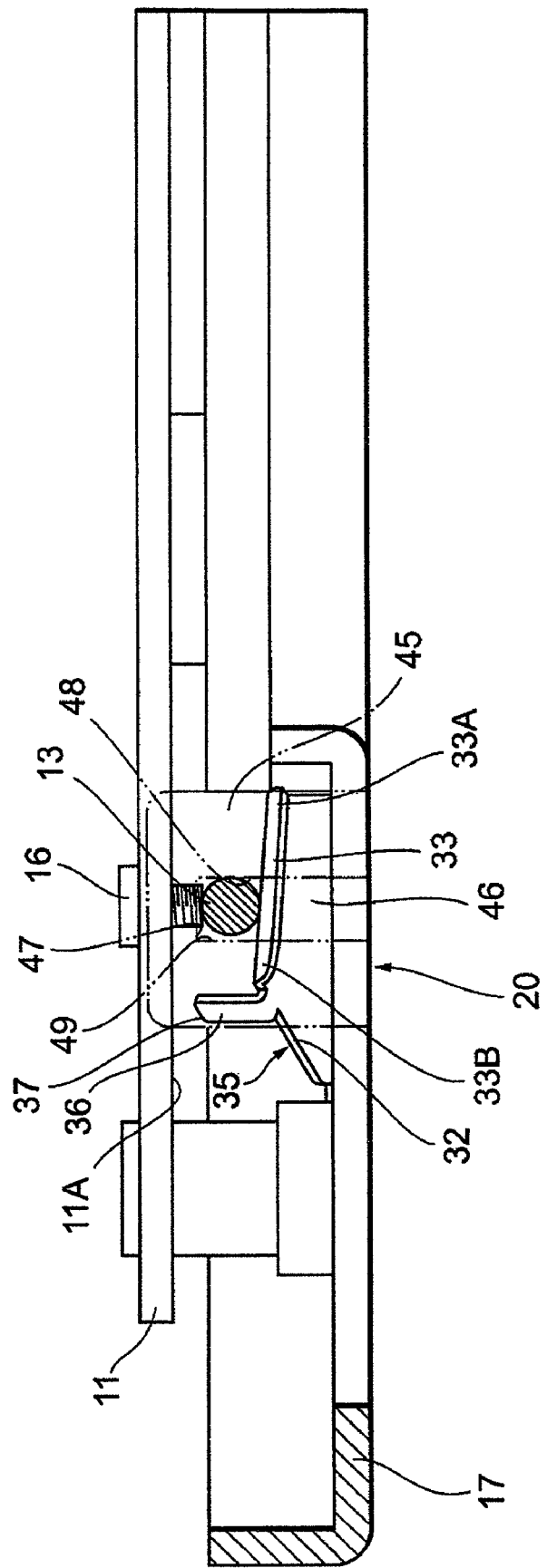
FIG. 16 is a view showing the neighborhood of the end of the guide shaft as viewed in a direction, in which the guide shaft is inserted.

FIG. 1 is a perspective view showing an optical disk apparatus, according to an embodiment, as viewed from a side, on which an optical disk is put, FIG. 2 is a perspective view showing the optical disk apparatus of FIG. 1 as viewed from an opposite side, FIG. 3 is a plan view showing a frame body, on which a leaf spring being a constituent element of the optical disk apparatus shown in FIG. 1 is arranged, as viewed from an opposite side to a side, on which an optical disk is put, FIG. 4 is a perspective view showing a chassis shown in FIG. 3, FIG. 5 is a cross sectional view taken along the line V-V in FIG. 3, FIGS. 6 to 10 are perspective views showing the neighborhood of an end of a guide shaft being a constituent element of the optical disk apparatus shown in FIG. 1, FIG. 11 is a front view showing the leaf spring shown in FIG. 3, FIG. 12 is a plan view showing the leaf spring shown in FIG. 11, FIG. 13 is a perspective view the leaf spring shown in FIG. 11, FIG. 14 is a side view the leaf spring shown in FIG. 11, FIG. 15 is a conceptual view illustrating the relationship between the leaf spring shown in FIG. 11 and the guide shaft, and FIG. 16 is a view showing the neighborhood of the end of the guide shaft as viewed in a direction, in which the guide shaft is inserted.

As shown in FIGS. 1 to 16, an optical disk apparatus 1 according to Embodiment 1 comprises a chassis 11 serving as a base, a disk motor 12 arranged on the chassis 11, a pair of guide shafts 13, 14 arranged on the chassis 11 to be spaced from and in parallel to each other, an optical pickup 15 supported movably on the guide shafts 13, 14 to perform recording/reproducing of a signal from an information recorded surface of an optical disk, adjustment screws 16 (see FIGS. 6 to 10) that move at least one ends of the guide shafts 13, 14 in directions substantially perpendicular to axial directions of the guide shafts 13, 14, a frame body 17 arranged in opposition to the chassis 11, a leaf spring 20 (see FIGS. 3 to 16) arranged on an opposite surface of the frame body 17 to a surface 11A (referred below to as "chassis surface 11A") of the chassis 11 to be positioned in opposition to one end of the guide shaft 13 to bias the one end of the guide shaft 13 toward the chassis surface 11A, and a guide-shaft inserted member 45 arranged in opposition to a free end of the leaf spring 20 and having an opening 46, into which one end of the guide shaft 13 is inserted. In addition, the reference numeral 18 denotes a stepper and 19 a flexible printed board.

Arranged rotatably on the disk motor 12 is a turntable 25 including a disk put surface 22, on which an optical disk is put, and a clamp portion 23, by which an optical disk put on the disk put surface 22 is clamped.

The guide shafts 13, 14 have one ends thereof arranged on a side toward the disk motor 12 and have the other ends thereof arranged on a side being separate from the disk motor 12 so as to guide the optical pickup 15 in a radial direction of an optical disk put on the turntable 25. An end of the guide shaft 14 arranged on a side toward the disk motor 12 is fixed to the chassis 11 and an opposite end thereof has a tip end of an adjustment screw (structured in the same manner as the adjustment screw 16 shown in FIGS. 6 to 10) abutting thereagainst, so that inclination of the guide shaft 14 is adjusted by an extent, over which the adjustment screw 16 is screwed. On the other hand, as shown in FIGS. 6 to 10 and 16, the end of the guide shaft 13 arranged on a side toward the disk motor 12 is arranged between the chassis 11 and the frame body 17 in a state of being interposed between the leaf spring 20 described later and the adjustment screw 16, so that inclination of the guide shaft 14 is adjusted by an extent, over which the adjustment screw 16 is screwed. Also, the end of the guide shaft 13 being separate from the disk motor 12 has a tip end of an adjustment screw (structured in the same manner as the adjustment screw 16 shown in FIGS. 6 to 10) abutting thereagainst, so that inclination of the guide shaft 14 is adjusted by an extent, over which the adjustment screw 16 is screwed. In this manner, tilt adjustment of the guide shafts 13, 14 is accomplished by adjusting extents, over which the respective adjustment screws 16 are screwed.

In particular, as shown in FIGS. 11 to 14, the leaf spring 20 comprises a fixed portion 31 for fixation to the frame body 17, a leaf spring body 35 formed to be contiguous to the fixed portion 31, and a stopper portion 36 projecting from one opposite side (free end side) to a side of the leaf spring body 35, on which the fixed portion 31 is formed. The fixed portion 31 is formed with screw holes 43, 44, through which screws 41, 42, respectively, for fixation of the leaf spring 20 to the frame body 17 extend. The leaf spring body 35 comprises a support surface 32 inclined in a direction, in which it is separate from the frame body 17 (that is, a direction toward the chassis surface 11A), and supporting the end of the guide shaft 13 arranged on a side toward the disk motor 12, and an inclined surface 33 formed to be contiguous on a side toward a free end of the support surface 32 and inclined in a direction, in which it approaches the frame body 17 with a distance to a tip end thereof (that is, a direction, in which it is separate from the chassis surface 11A). The inclined surface 33 is further inclined in a direction, in which one side 33A thereof along a free end approaches the frame body 17 further than the other side 33B does (that is, a direction, in which it is separate from the chassis surface 11A).

The stopper portion 36 serves to adjust the height of the leaf spring 20 so that a space making for an end of the guide shaft 13 to be easily inserted between the leaf spring 20 and the chassis surface 11A is ensured by having a projecting end 37 thereof abutting against the chassis surface 11A. That is, when the end of the guide shaft 13 is not put on the support surface 32 of the leaf spring 20 (see FIGS. 6 and 9), the projecting end 37 of the stopper portion 36 abuts against the chassis surface 11A to latch the leaf spring 20 thereon and to define a clearance between the chassis surface 11A and the leaf spring 20. When the end of the guide shaft 13 is to be inserted to be put on the support surface 32, the presence of the clearance enables the end of the guide shaft 13 to be simply inserted between the leaf spring 20 and the chassis surface 11A, so that it is possible to achieve an improvement in assembling activity. Consequently, the spring force becomes easy to be adjusted, thus enabling use of a leaf spring having a small spring constant.

Figure 17:
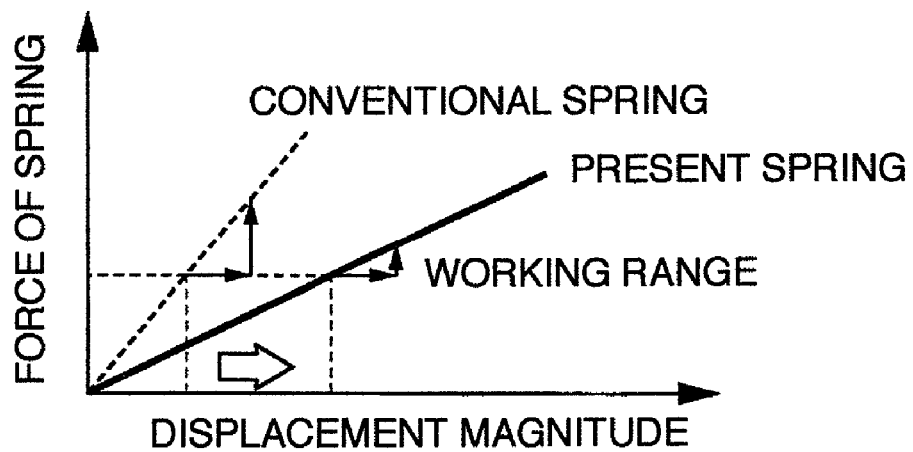
FIG. 17 is a view illustrating the relationship between a displacement magnitude of a spring and a spring force.

Hereupon, FIG. 17 shows the relationship between a displacement magnitude and a force of a spring with respect to the leaf spring 20 (spring according to the embodiment) formed with the stopper portion 36 and a conventional leaf spring (conventional spring) formed with no stopper portion. It is found from FIG. 17 that a smaller spring force than that of the conventional spring enables the spring according to the embodiment to be displaced by the same magnitude as that of the former. Accordingly, adjustment of a force is easier in the spring according to the embodiment than in the conventional spring.

Also, since the leaf spring 20 is formed at a tip end thereof with the inclined surface 33 inclined in a direction, in which it is separate from the chassis surface 11A with a distance to a tip end thereof, it is possible to further enlarge a clearance, which is formed between the tip end of the leaf spring 20 and the chassis surface 11A to permit an end of the guide shaft 13 to be inserted thereinto. Accordingly, insertion of the end of the guide shaft 13 can be made further simple.

The guide-shaft inserted member 45 is formed integral with the frame body 17 and provided upright in a position opposed to the free end of the leaf spring 20. The guide-shaft inserted member 45 is formed centrally thereof with an opening 46, through which the end of the guide shaft 13 can be inserted and removed. When the end of the guide shaft 13 put on the support surface 32 of the leaf spring 20 is biased toward the chassis surface 11A by the bias of the leaf spring 20, a wall portion 47 defining the opening 46 on a side toward the chassis surface 11A serves to have the end of the guide shaft 13 abutting thereagainst to prevent the end of the guide shaft 13 from moving further. Also, wall portions 48, 49 made substantially perpendicular to the wall portion 47 defining the opening 46 serve to prevent the end of the guide shaft 13 from moving horizontally.

Figure 8:
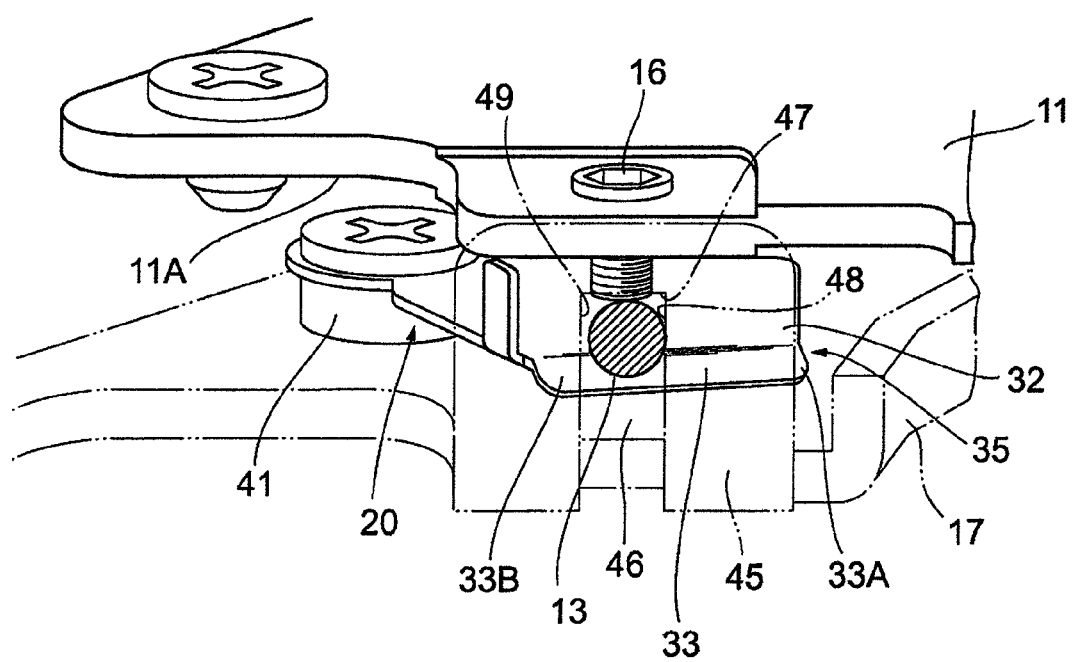
FIG. 8 is a perspective view showing the neighborhood of the end of the guide shaft being a constituent element of the optical disk apparatus shown in FIG. 1.
Figure 9:
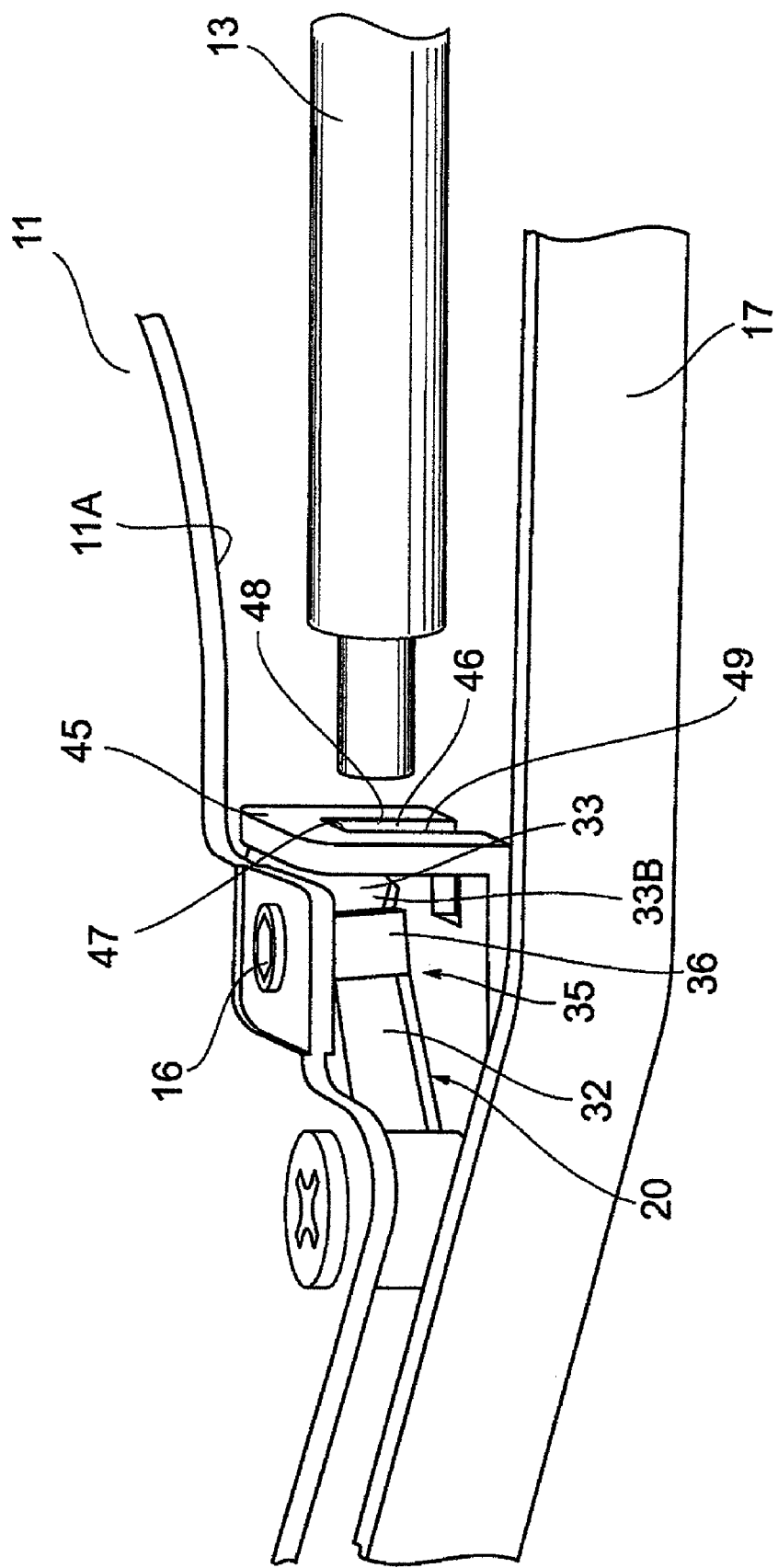
FIG. 9 is a perspective view showing the neighborhood of the end of the guide shaft being a constituent element of the optical disk apparatus shown in FIG. 1.
Figure 10:
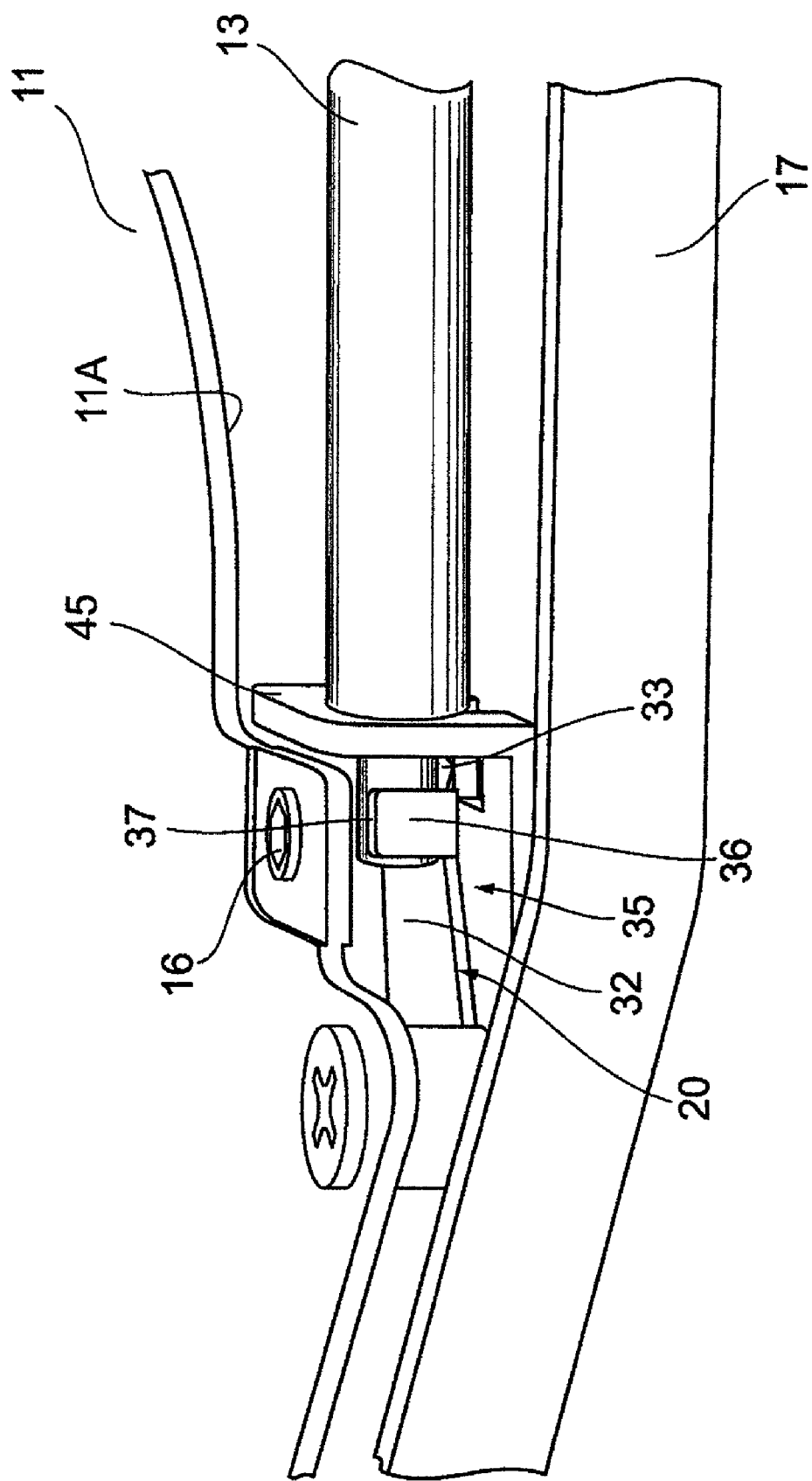
FIG. 10 is a perspective view showing the neighborhood of the end of the guide shaft being a constituent element of the optical disk apparatus shown in FIG. 1.

Here, as described above, the inclined surface 33 formed at the tip end of the leaf spring 20 is inclined in a direction, in which it is separate from the chassis surface 11A with a distance to a tip end thereof, while the one side 33A is further inclined in a direction, in which it is separate from the chassis surface 11A, than the other side 33B is, so that the end of the guide shaft 13 is guided toward the one side 33A as indicated by an arrow X in FIG. 15. Accordingly, as shown in FIGS. 8 and 16, the end of the guide shaft 13 is put in a state of being pushed against the wall portion 48, so that it is possible to inhibit the guide shaft 13 from being made loose. Consequently, it is possible to maintain the guide shaft 13 in a stable state, thus enabling achieving an improvement in assembling activity. In addition, the leaf spring 20 exerts the bias in a direction indicated by an arrow Z in FIG. 15.

On the other hand, as shown in FIGS. 7, 8, 10, and 16, when the end of the guide shaft 13 is put on the support surface 32 of the leaf spring 20, the end of the guide shaft 13 abuts against the wall portion 47 of the guide-shaft inserted member 45 to be surely fixed in a state of being interposed by the wall portion 47 and the leaf spring 20. At this time, the leaf spring 20 is pushed toward the frame body 17 by the end of the guide shaft 13, so that the projecting end 37 of the stopper portion 36 is separated toward the frame body 17 from the chassis surface 11A.

In addition, in this state, tilt adjustment of the guide shafts 13, 14 as described above is accomplished by the adjustment screws 16.

Figure 18:
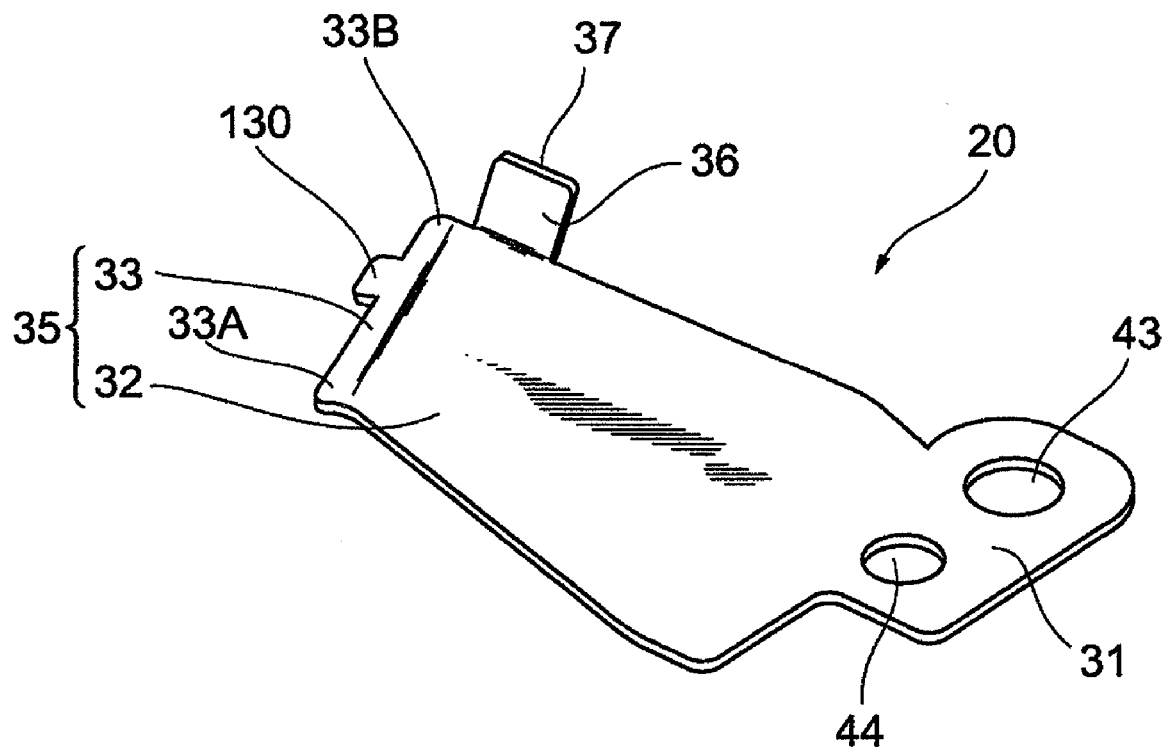
FIG. 18 is a perspective view showing a leaf spring in a further embodiment.
Figure 19:
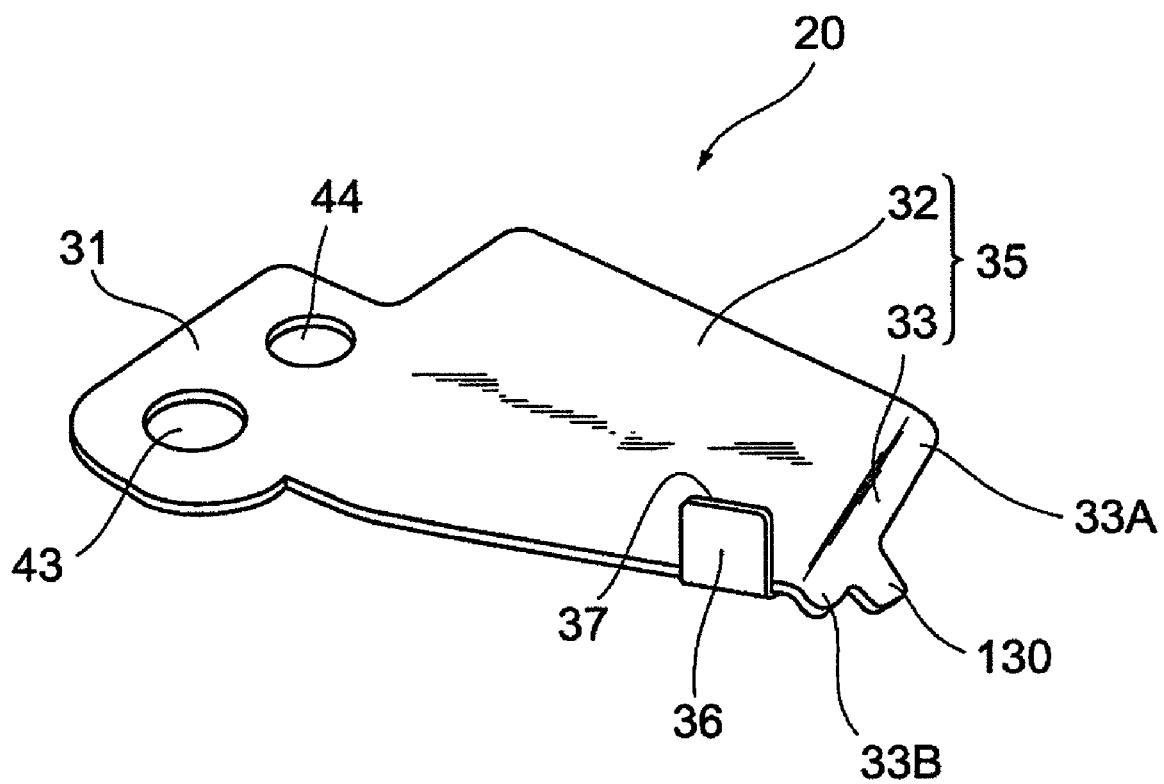
FIG. 19 is a perspective view showing a leaf spring in a still further embodiment.

Also, as shown in, for example, FIGS. 18 and 19, an extension 130 may be formed at a tip end of the inclined surface 33 of the leaf spring 20 to extend to an interior of the opening 46 of the guide-shaft inserted member 45. The extension 130 is inclined to be separate from the chassis surface 11A with a distance to a tip end thereof, and the end of the guide shaft 13 pushes the extension 130 toward the frame body 17 whereby the end of the guide shaft 13 can be further easily inserted between the leaf spring 20 and the chassis surface 11A.

In addition, while the embodiment has been described taking, as an example, the leaf spring 20 formed with the inclined surface 33 and the stopper portion 36, the bias member according to the embodiment is not limited thereto but may comprise a leaf spring provided with the stopper portion 36 but not with the inclined surface 33, or a leaf spring provided with inclined surface 33 but not with the stopper portion 36.

Also, the embodiment has been described with respect to the structure, in which the inclined surface 33 is inclined in a direction, in which it approaches the frame body 17 with a distance to a tip end thereof (that is, a direction, in which it is separate from the chassis surface 11A), and also inclined in a direction, in which the one side 33A thereof along the free end approaches the frame body 17 (that is, a direction, in which it is separate from the chassis surface 11A), than the other side 33B. The inclined surface 33 is, however, not limited thereto but the one side 33A may be further inclined in a direction, in which it is separate from the frame body 17, than the other side 33B. In this case, the end of the guide shaft 13 is pushed against the wall portion 49 of the guide-shaft inserted member 45. Also, the inclined surface 33 may not be inclined in a direction along the one side 33A and the other side 33B but may be inclined simply in a direction, in which it approaches the frame body 17 with a distance to a tip end thereof. Further, the inclined surface 33 may not be inclined toward a tip end thereof, but may be inclined simply in a direction along the one side 33A and the other side 33B.

Further, while the embodiment has been described with respect to the case where the leaf spring 20 is arranged in a position to enable pushing the end of the guide shaft 13, the leaf spring 20 is not limited thereto but the leaf spring 20 may be arranged in a position to enable pushing the other end of the guide shaft 13, or in a position to enable pushing an end or the other end of the guide shaft 14. Also, locations, in which leaf springs are arranged, and the number of leaf springs as arranged can be optionally determined such that the respective leaf springs are arranged in positions to enable pushing both ends of the guide shaft 13.

With the present, optical disk apparatus, the stopper portion can ensure a clearance, into which the guide shaft is easily inserted, between the support surface and the chassis surface when the guide shaft is to be inserted between the support surface of the bias member and the adjustment member. Consequently, it is possible to achieve an improvement in assembling activity.

Also, with the present, optical disk apparatus, the end of the guide shaft extending through the opening formed on the guide-shaft inserted member to be arranged between the leaf spring and the adjustment member can be guided to the one side of the leaf spring by the inclined surface. Consequently, the guide shaft can be caused to abut against one (one disposed on the one side of the free end of the leaf spring) of the wall portions, which define the opening, and maintained in a stable state, so that it is possible to achieve an improvement in assembling activity.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical disk apparatus that performs at least one of recording and reproducing of a signal from an information recorded surface of an optical disk mounted thereon, the optical disk apparatus comprising
   a chassis,
   a disk motor, which is arranged on the chassis and on which a turntable having a disk put surface, on which the optical disk is put, is rotatably provided,
   an optical pickup that performs at least one of recording and reproducing of a signal from the information recorded surface of the optical disk, a pair of guide shafts arranged on the chassis to movably support the optical pickup to guide the same radially of the optical disk,
   an adjustment member that moves at least one end of the guide shaft in a direction substantially perpendicular to a surface of the chassis, and
   a bias member arranged on an opposite side to the adjustment member with one end of the guide shaft interposed therebetween and biasing the one end of the guide shaft toward the surface of the chassis, and
   wherein the bias member includes a support surface, which supports the one end of the guide shaft, and a stopper portion projecting from the support surface to abut against the surface of the chassis to define a clearance between the support surface and the surface of the chassis, wherein
   the stopper portion and the surface of the chassis are separated from each other when the one end of the guide shaft is arranged in the clearance.

2. The optical disk apparatus according to claim 1, wherein the bias member comprises a leaf spring, the leaf spring being formed at a free end thereof with an inclined surface in a direction, in which it is separate from the surface of the chassis with a distance to a tip end thereof.

3. The optical disk apparatus, according to claim 2, further comprising a guide-shaft inserted member arranged in opposition to the free end of the leaf spring and having an opening, into which the one end of the guide shaft is inserted, and
   wherein one side of the inclined surface along the free end is inclined further so as to be separate from the surface of the chassis than the other side.

4. The optical disk apparatus according to claim 3, wherein the inclined surface further includes an extension extending into an opening formed on the guide-shaft inserted member, the extension being inclined to be separate from the surface of the chassis with a distance to a tip end thereof.

* * * * *